(12) United States Patent
Zhao et al.

(10) Patent No.: US 12,278,731 B1
(45) Date of Patent: Apr. 15, 2025

(54) IOT POLICY RECOMMENDATION LARGE LANGUAGE MODEL (LLM) EMBEDDINGS BASED GLOBAL BEHAVIOR LEARNING

(71) Applicant: Palo Alto Networks, Inc., Santa Clara, CA (US)

(72) Inventors: Yilin Zhao, Sunnyvale, CA (US); Yelman Ur Rehman Khan, Sunnyvale, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/385,837

(22) Filed: Oct. 31, 2023

(51) Int. Cl.
*H04L 41/0894* (2022.01)
*H04L 67/12* (2022.01)

(52) U.S. Cl.
CPC .......... *H04L 41/0894* (2022.05); *H04L 67/12* (2013.01)

(58) Field of Classification Search
None
See application file for complete search history.

(56) References Cited

U.S. PATENT DOCUMENTS

| | | | |
|---|---|---|---|
| 2017/0054810 A1* | 2/2017 | Evans | H04L 41/145 |
| 2022/0027709 A1* | 1/2022 | Honkala | G06N 3/08 |
| 2024/0029864 A1* | 1/2024 | Sehanobish | G16H 50/20 |
| 2024/0070141 A1* | 2/2024 | Cohen | G06F 21/60 |

OTHER PUBLICATIONS

Ali et al., HuntGPT: Integrating Machine Learning-Based Anomaly Detection and Explainable AI with Large Language Models (LLMs), arXiv:2309.16021v1 [cs. CR] Sep. 27, 2023.
Author Unknown, Get Text Embedding, Vertex AI, Google Cloud, downloaded Oct. 26, 2023, pp. 1-8.
Du et al., Spear or Shield: Leveraging Generative AI to Tackle Security Threats of Intelligent Network Services, arXiv:2306.02384v1 [cs.CR] Jun. 4, 2023, pp. 1-9.
Tang et al., PolicyGPT: Automated Analysis of Privacy Policies with Large Language Models, Sep. 20, 2023, pp. 1-19.

* cited by examiner

*Primary Examiner* — William G Trost, IV
*Assistant Examiner* — Christopher P Cadorna
(74) *Attorney, Agent, or Firm* — Van Pelt, Yi & James LLP

(57) ABSTRACT

Techniques for IoT policy recommendation LLM embeddings based on global behavior learning are disclosed. In some embodiments, a system, process, and/or computer program product for IoT policy recommendation LLM embeddings based on global behavior learning includes receiving information associated with network communications of a plurality of Internet of Things (IoT) devices; automatically learning a global common behavior for the plurality of IoT devices using a Large Language Model (LLM) classifier to generate a plurality of recommended rules; and applying a policy to at least one of the plurality of IoT devices based on one or more of the plurality of recommended rules.

20 Claims, 13 Drawing Sheets

522 dhcp is a networking, infrastructure application.
The app description is: DHCP is a set of rules used by communications devices such as a computer, router or network adapter to allow the device to request and obtain an IP address from a server which has a list of addresses available for assignment.

dclink is a business-systems, erp-crm application.
The app description is: dcLINK offers the most comprehensive solution for oracle, JD Edwards EnterpriseOne, JD Edwards World, PeopleSoft, SAP, Lawson (Movex), and SSA Global users by bringing together data collection, system integration, automation interfacing and label printing. DSI's complete solution includes RFID, bar code and wireless hardware, media, software, services, and support.

App Description to Embeddings →

Cluster 1
Number of devices in the cluster: 50
Device ids of devices in the cluster:
['90:1b:0e:ea:14:53', '10.104.50.158', '4c:52:62:11:3f:23', '10.20.136.101', 'ac:1f:6b:1b:0d:cc', '98:ee:cb:f4:f6:01', '10.150.80.116', '10.150.80.162', '90:1b:0e:ea:86:19', '90:1b:0e:ea:86:dd', '10.32.163.106', '10.150.22.60', '10.204.164.230', '10.50.61.100', '90:1b:0e:ea:e3:25', '4c:52:62:11:44:9a', '4c:52:62:ad:3a:d4', '10.157.3.125', '10.150.22.59', '10.23.84.85', '4c:52:62:11:46:f6', 'c8:1f:ea:8e:e7:61', '10.207.245.229', '10.80.2.25', '10.33.64.53', '90:1b:0e:ea:7f:45', '10.11.125.58', '4c:52:62:ad:35:ae', '4c:52:62:11:3d:91', '172.16.32.54', '10.194.64.218', '4c:52:62:ad:33:51', '10.21.40.107', '4c:52:62:11:48:da', '90:1b:0e:ea:82:14', '4c:52:62:11:40:97', '90:1b:0e:ea:ec:b4', '62:f7:4c:41:bc:49', '10.214.25.203', 'a4:bb:6d:e1:5c:3a', '90:1b:0e:e7:a1:d4', '2c:6d:c1:23:1c:7a', 'a4:bb:6d:b5:08:d6', '6c:2b:59:ec:8f:79', '3c:ec:ef:bf:7c:62', 'd0:27:88:f6:e6:32', 'd8:9e:f3:23:a1:10', 'b0:7b:25:02:d9:6c', '192.168.29.144']

Applications:
['rtp-base', 'netbios-ns', 'ssl', 'ftp', 'netbios-dg', 'dns-base', 'http-proxy', 'soap', 'icmp', 'ike', 'hp-printer-websrv-check-update', 'traceroute', 'ocsp', 'ntp-base', 'ping', 'dicom', 'OH-ldap-u389etc', 'h.225', 'rtcp', 'dhcp', 'ms-ds-smbv3', 'snmp-base', 'ldap', 'ms-update', 'windows-azure-base', 'icmp_echo_reply', 'web-browsing', 'net.tcp', 'snmpv1']

Cluster 5
Number of devices in the cluster: 5
Device ids of devices in the cluster:
['10.23.130.47', '74:fe:48:67:c1:c8', 'a4:bb:6d:b2:bb:25', '00:a5:bf:2e:c8:9f', '48:4d:7e:ea:92:36']
Applications:
['apple-siri', 'new-relic', 'microsoft-intune', 'ms-delve', 'google-app-engine', 'sharepoint-online', 'malwarebytes', 'google-play', 'pinterest-base', 'upnp', 'paloalto-userid-agent', 'icmp', 'dtls', 'beyond-trust-remote-support', 'webex-base', 'traps-management-service', 'hubspot', 'slideshare-base', 'webdav', 'h.225', 'dhcp', 'apple-game-center', 'snmp-base', 'ms-office365-base', 'spotify', 'sip', 'ms-ds-smb-base', 'rss', 'quora-base', 'dropbox-base', 'dynatrace-app-monitoring', 'yahoo-web-analytics', 'ms-kms', 'google-docs-base', 'helpscout', 'brightcove', 'msrpc-base', 'office365-enterprise-access', 'ms-netlogon', 'outlook-web-online', 'syslog', 'paloalto-logging-service', 'netbios-ns', 'grammarly', 'snapchat', 'youtube-base', 'mendeley-base', 'ms-exchange', 'dns-base', 'mcafee-update', 'http-proxy', 'samsung-updates', 'viber-base', 'ms-update-optimization-p2p', 'google-analytics', 'disqus', 'traceroute', 'itunes-base', 'cisco-spark-base', 'zoom-base', 'eventbrite', 'google-cloud-storage-base', 'windows-defender-atp-endpoint', 'whatsapp-base', 'imo', 'paloalto-wildfire-cloud', 'paloalto-iot-security', 'ms-onedrive-base', 'vimeo-base', 'yahoo-mail-base', 'zoominfo', 'soundcloud-base', 'ms-product-activation', 'hulu-base', 'paloalto-dns-security', 'facebook-social-plugin', 'cloudinary-base', 'ms-local-security-management', 'active-directory-base', 'ms-sms', 'liveperson', 'yammer-base', 'http-audio', 'gmail-base', 'zoom-meeting', 'amazon-cloud-drive-uploading', 'okta', 'rtp-base', 'giphy-base', 'oracle-eloqua', 'ms-sql-analysis-service', 'naver-line', 'yelp-base', 'facetime', 'outlook-web', 'citrix', 'questionpro-base', 'google-base', 'panorama', 'ntp-non-rfc', 'giphy-downloading', 'whatsapp-file-transfer', 'bing-maps', 'rtp-audio', 'zoho-crm', 'constant-contact', 'dns-over-https', 'linkedin-mail', 'google-drive-web', 'ike', 'mailchimp', 'appdynamics', 'ocsp', 'ping', 'ms-teams', 'google-maps', 'websocket', 'App-Override-THC-VoIP-TCP', 'github-base', 'sumo-logic', 'quic', 'http-video', 'mssql-db-base', 'adobe-update', 'calendly', 'ms-ds-smbv3', 'apple-push-notifications', 'filestack-base', 'ms-update', 'facebook-video', 'ms-onedrive-business', 'datadog', 'ssdp', 'ring', 'netbios-ss', 'epic', 'ms-outlook-uploading', 'aws-iot', 'mssql-db-unencrypted', 'vmware-carbon-black', 'net.tcp', 'snmpv1', 'Custom-UofT-O365', 'paloalto-device-telemetry', 'sharepoint-online-editing', 'netflix-base', 'dns-over-tls', 'salesforce-base', 'mqtt-subscribe', 'ms-rdp', 'mqtt-base', 'ipsec-esp-udp', 'forticlient-update', 'apple-maps', 'llmnr', 'zendesk-base', 'webex-connect', 'telnet', 'twitter-base', 'glassdoor-base', 'ssl', 'netbios-dg', 'dnscrypt', 'tiktok', 'soap', 'smtp-base', 'ms-outlook-downloading', 'whatsapp-voice', 'facebook-base', 'arcgis-base', 'ntp-base', 'linkedin-base', 'yahoo-calendar', 'stun', 'mapi-over-http', 'rtcp', 'instagram-base', 'hotmail', 'bittorrent', 'reddit-base', 'sharepoint-online-uploading', 'ms-store', 'web-browsing', 'paloalto-updates', 'google-messages', 'ldap', 'pyxis', 'pan-db-cloud', 'windows-azure-base', 'paloalto-shared-services', 'dailymotion', 'blog-posting', 'google-update', 'google-translate-base', 'kerberos', 'cloud-base', 'youtube-streaming', 'windows-push-notifications']

```
context = """
You're an device researcher and know everything about the various IT and IoT devices and their behavior, usage.

Here are the app names and their descriptions:
...
dicom: 'DICOM (Digital Imaging and Communications in Medicine) is a standard for handling, storing, printing, an
facebook-base: 'facebook-base is a saas, social-networking application that belongs to the facebook container. T
rtcp: 'rtcp is a media, photo-video application. The app description is: Real-time Transport Control Protocol (R
rtp-base: 'rtp-base is a media, photo-video application that belongs to the rtp container. The app description i
snmp-base: 'snmp-base is a networking, infrastructure application that belongs to the snmp container. The app de
snmpv1: 'snmpv1 is a networking, infrastructure application that belongs to the snmp container. The app descript
tiktok: 'tiktok is a media, photo-video application. The app description is: TikTok is a video social network ap
web-browsing: 'web-browsing is a general-internet, internet-utillity application. The app description is: Web Bro
"""
question = """
Based on the above app names and descriptions and your expertise of X-ray machines, GIVE ME A LIST of apps
from

['rtp-base', 'snmp-base', 'snmpv1', 'rtcp', 'web-browsing', 'facebook-base', 'tiktok']
"""
```

Output:
The following apps should not be used by a Carestream X-Ray machine:
- facebook-base
- tiktok

IOT POLICY RECOMMENDATION LARGE LANGUAGE MODEL (LLM) EMBEDDINGS BASED GLOBAL BEHAVIOR LEARNING

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer and can perform additional nefarious tasks (e.g., exfiltrating sensitive data, propagating to other systems, etc.). A variety of approaches can be used to harden computers against such and other compromises. Unfortunately, existing approaches to protecting computers are not necessarily suitable in all computing environments. Further, malware authors continually adapt their techniques to evade detection, and an ongoing need exists for improved techniques to detect malware and prevent its harm in a variety of situations.

BRIEF DESCRIPTION OF THE DRAWINGS

Various embodiments of the invention are disclosed in the following detailed description and the accompanying drawings.

FIG. 5B is an example of an embedding in accordance with some embodiments.

FIGS. 5C-1 and 5C-2 illustrate an identification of common behavior using embedding and clustering in accordance with some embodiments.

FIG. 5D illustrates an identification of common behavior using an LLM classifier in accordance with some embodiments.

DETAILED DESCRIPTION

Figure 1:
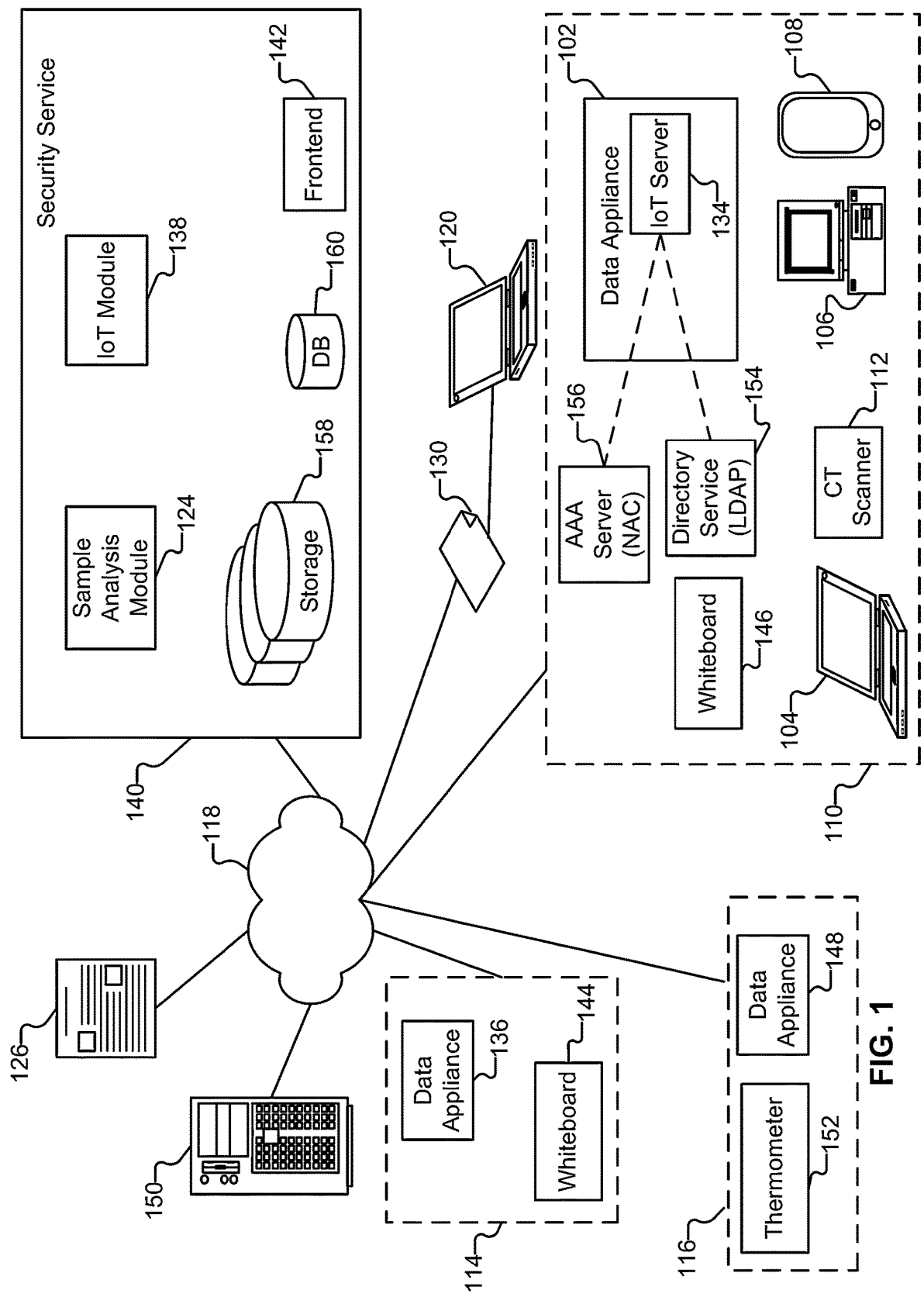
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), Content-ID for real-time content scanning (e.g., controlling web surfing and limiting data and file transfers), and Device-ID (e.g., for IoT device type identification). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security for Internet of Things Devices in Network Environments With the ever increasing number of Internet of Things (IoT) devices in a network, it is becoming increasingly critical to meet the specific security requirements of each and every IoT device. For example, it is important to monitor the network traffic for these IoT devices and ensure that the correct network behavior is in place for the proper functioning of these IoT devices and the network (e.g., enterprise network). Learning a common network behavior pattern for a given IoT device type common across multiple tenants and unique to itself is therefore an important task. This allows enterprises to have proper rules (e.g., policy rules, such as security rules) configured in a security policy and deployed/implemented on their security platforms (e.g., NGFWs/firewalls).

However, the significant and ever increasing number of distinct IoT devices and the nature of applications (apps) associated with these varied IoT devices requires a sophisticated solution to recommend common apps & destinations and in turn generate better policy rules.

Thus, what is needed are improved solutions for IoT policy rule recommendations.

Overview of Techniques for IoT Policy Recommendation LLM Embeddings Based on Global Behavior Learning Generally, learning common behaviors associated with various IoT devices (e.g., distinct IoT device types) is difficult due to several technical challenges. First, there is a significant amount of data associated with the monitoring of IoT devices (e.g., collected IoT data), and distinct types of IoT devices typically have different common behaviors. Second, even the same type of IoT devices can have several different categories of common behaviors due to different usage patterns (e.g., based on different and/or uncommon apps used with the IoT devices, etc.). Third, the collected IoT data is typically noisy data due to data collection issues, such as mixed traffic (e.g., as there can be multiple IoT devices behind a Network Address Translation (NAT) device such that the traffic is typically a mix of traffic from multiple IoT devices behind the NAT device) and device misidentification. Fourth, IoT devices can change behaviors over time (e.g., based on different use case scenarios or changes in apps associated with such IoT devices, etc.).

Traditional approaches for IoT device security analysis have generally been based on using fixed thresholds and frequency calculations. But such fixed thresholds and frequency calculations are generally per tenant, per device profile dependent. Also, such fixed thresholds and frequency calculations are generally not effective for the above-described technical challenge of noisy IoT devices and can also result in higher false positives (FPs).

However, such traditional approaches are inadequate to address the above described technical challenges for IoT device security analysis.

Accordingly, techniques for IoT policy recommendation Large Language Model (LLM) embeddings based on global behavior learning are disclosed.

For example, the disclosed techniques for IoT policy recommendation LLM embeddings based on global behavior learning can be applied to facilitate automatically generating security policy rule recommendations based on observed baseline (e.g., normal and/or acceptable) network behaviors of IoT devices in the same device profile across multiple IoT security tenants, such as will be further described below with respect to various embodiments.

Moreover, the disclosed techniques for IoT policy recommendation LLM embeddings based on global behavior learning can be applied to facilitate a dynamic and robust solution for identifying abnormal IoT devices on an enterprise network (e.g., and to generate clusters of similar IoT device behavior), such as will be further described below with respect to various embodiments.

Further, LLM models can be trained to recognize context, which allows for the application of trained LLM models to facilitate an efficient and effective learning of behaviors across distinct IoT device types in various network environments (e.g., enterprise networks) to allow for automated identification of normal and abnormal behaviors, such as will also be further described below with respect to various embodiments.

In some embodiments, a system, process, and/or computer program product for IoT policy recommendation LLM embeddings based on global behavior learning includes receiving information associated with network communications of a plurality of Internet of Things (IoT) devices; automatically learning a global common behavior for the plurality of IoT devices using a Large Language Model (LLM) classifier to generate a plurality of recommended rules; and applying a policy to at least one of the plurality of IoT devices based on one or more of the plurality of recommended rules.

For example, the disclosed techniques for IoT policy recommendation LLM embeddings based on global behavior learning provide a policy recommendation common behavior identification solution that can automatically recognize and remove noisy samples from device traffic data, automatically summarize common behavior patterns for each device type using vector embedding on behavior and clustering techniques as further described below, and verify all the common behavior patterns learned from the clustering with the disclosed LLM-based classification model.

As such, the disclosed techniques for IoT policy recommendation LLM embeddings based on global behavior learning can be applied to automatically train an unsupervised model (e.g., an LLM-based classification model) without any labels.

Also, the disclosed techniques for IoT policy recommendation LLM embeddings based on global behavior learning utilizes a dynamic approach to cluster IoT devices (e.g., which is dynamic and more effective than simply using a fixed threshold approach as described above).

In addition, the disclosed techniques for IoT policy recommendation LLM embeddings based on global behavior learning capture the common behavior patterns of IoT devices from the network traffic data and allows for better policy rules (e.g., security policy rules). For example, the disclosed techniques can automatically identify one or more of the following: (1) a common application for IoT devices not locally observed by a tenant; (2) a common application for IoT devices locally observed by a tenant; and (3) an application that is unique for a tenant for an IoT device type.

Furthermore, the disclosed techniques for IoT policy recommendation LLM embeddings based on global behavior learning are applicable to multiple IoT device types and tenants and are effective and efficient as a general approach to common app generation while also allowing IoT device and tenant specific fine-tuning (e.g., and also generates common destination behaviors for each profile type).

Moreover, the disclosed techniques for IoT policy recommendation LLM embeddings based on global behavior learning along with dynamic clustering improve the policy recommendation process, such as for configuring a security policy for a security platform(s) (e.g., NGFW(s)/firewall(s) for tenants/enterprise customers).

These and various other techniques for IoT policy recommendation LLM embeddings based on global behavior learning will now be further described below with respect to various embodiments.

Example System Embodiments for Iot Policy Recommendation LLM Embeddings Based on Global Behavior Learning Overview of IoT Security Enforcement Using Security Platforms Services FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based system, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes use of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote Security service 140. Security service 140 can provide a variety of services, including performing static and dynamic analysis on malware samples (e.g., via sample analysis module 124), and providing a list of signatures of known-malicious files, domains, etc., to data appliances, such as data appliance 102 as part of a subscription. As will be described in more detail below, Security service 140 can also provide information (e.g., via IoT module 138) associated with the discovery, classification, management, etc., of IoT devices present within a network such as network 110. In various embodiments, signatures, results of analysis, and/or additional information (e.g., pertaining to samples, applications, domains, etc.) is stored in database 160. In various embodiments, Security service 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security service 140 can be implemented across a scalable infrastructure comprising multiple such servers, solid state drives or other storage 158, and/or other applicable high-performance hardware. Security service 140 can comprise several distributed components, including components provided by one or more third parties. For example, portions or all of Security service 140 can be implemented using the Amazon Elastic Compute Cloud (EC2) and/or Amazon Simple Storage Service (S3). Further, as with data appliance 102, whenever Security service 140 is referred to as performing a task, such as storing data or processing data, it is to be understood that a subcomponent or multiple sub-components of Security service 140 (whether individually or in cooperation with third party components) may cooperate to perform that task. As examples, Security service 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers Security service 140, but may also be provided by a third party. As one example, the virtual machine server can rely on EC2, with the remainder portions of Security service 140 provided by dedicated hardware owned by and under the control of the operator of Security service 140.

Figure 2A:
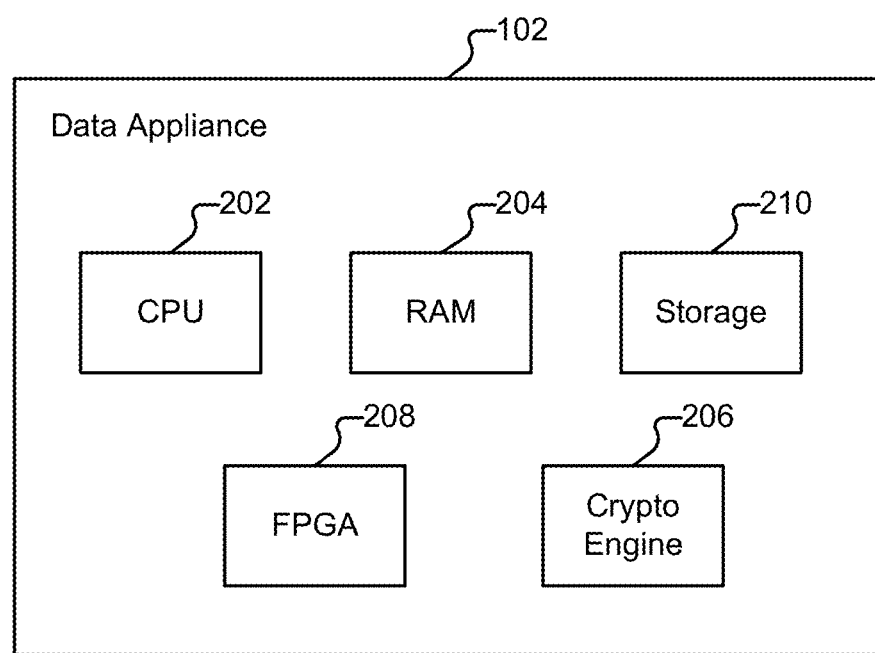
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 is instead (or in addition) provided to a client device (e.g., client device 104 or client device 106) by software executing on the client device. Functionality described herein as being performed by data appliance 102 can also be performed at least partially by or in cooperation with Security service 140, and/or functionality described herein as being performed by Security service 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on. Another example of a component included in data appliance 102 in various embodiments is an IoT server 134, described in more detail below. IT server 134 can take a variety of forms, including as a standalone server (or set of servers), whether physical or virtualized, and can also be collocated with/incorporated into data appliance 102 as applicable (e.g., as shown in FIG. 1).

Figure 2B:
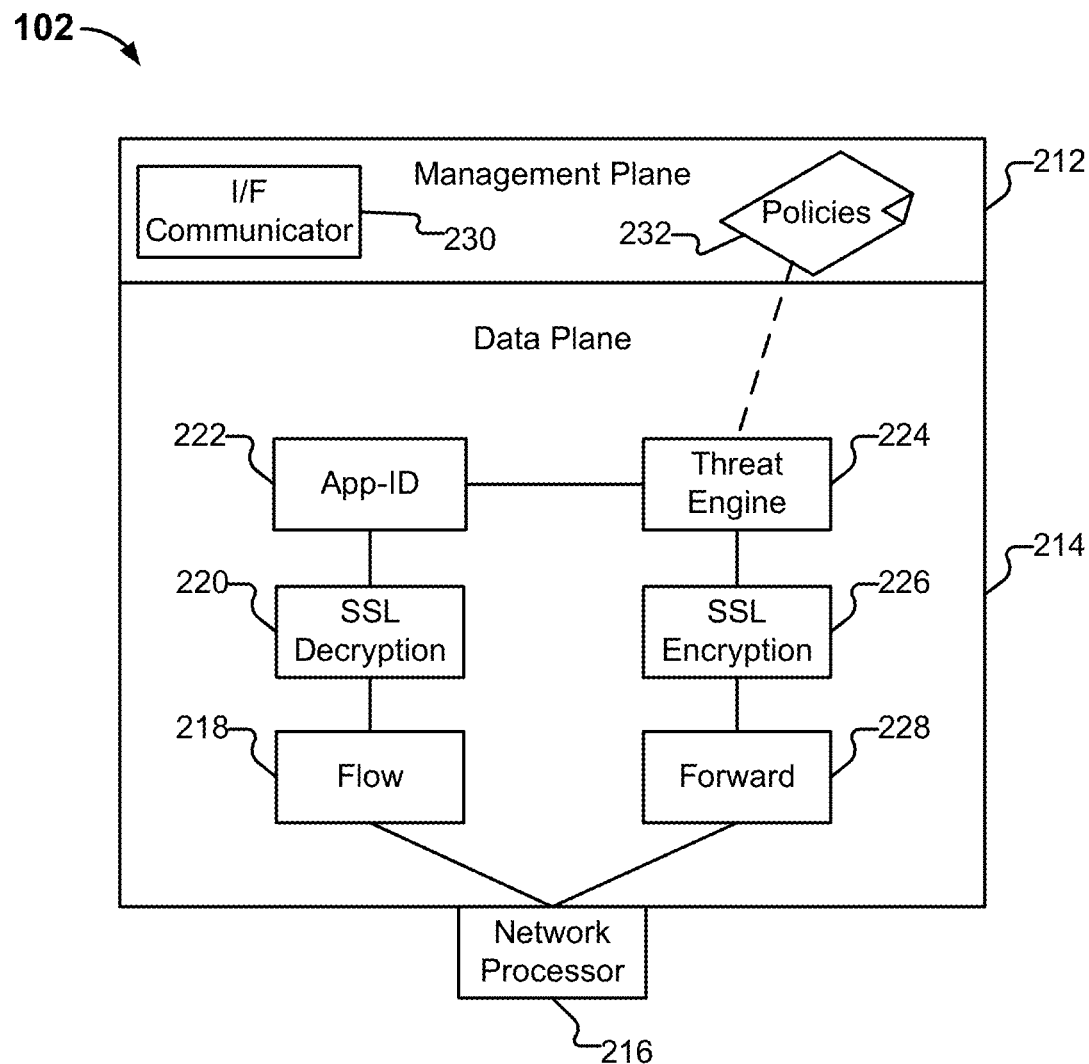
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 212 and a data plane 214. The management plane is responsible for managing user interactions, such as by providing a user interface for configuring policies and viewing log data. The data plane is responsible for managing data, such as by performing packet processing and session handling.

Network processor 216 is configured to receive packets from client devices, such as client device 108, and provide them to data plane 214 for processing. Whenever flow module 218 identifies packets as being part of a new session, it creates a new session flow. Subsequent packets will be identified as belonging to the session based on a flow lookup. If applicable, SSL decryption is applied by SSL decryption engine 220. Otherwise, processing by SSL decryption engine 220 is omitted. Decryption engine 220 can help data appliance 102 inspect and control SSL/TLS and SSH encrypted traffic, and thus help to stop threats that might otherwise remain hidden in encrypted traffic. Decryption engine 220 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 222 is configured to determine what type of traffic a session involves. As one example, application identification engine 222 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 222, the packets are sent, by threat engine 224, to an appropriate decoder configured to assemble packets (which may be received out of order) into the correct order, perform tokenization, and extract out information. Threat engine 224 also performs signature matching to determine what should happen to the packet. As needed, SSL encryption engine 226 can re-encrypt decrypted data. Packets are forwarded using a forward module 228 for transmission (e.g., to a destination).

As also shown in FIG. 2B, policies 232 are received and stored in management plane 212. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 230 is provided for management communications (e.g., via (REST) APIs, messages, or network protocol communications or other communication mechanisms). Policies 232 can also include policies for managing communications involving IoT devices.

IoT Device Discovery and Identification

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144, shown within enterprise network 114, and 146). Such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer oriented IoT devices (e.g., cameras) may also be present in an enterprise network. As with commodity computing devices, IoT devices present within a network may communicate with resources that are both internal or external to such networks (or both, as applicable).

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152, shown within enterprise network 116, communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved and the harms posed to such networks can be reduced.

In various embodiments, data appliance 102 includes an IoT server 134. IoT server 134 is configured to identify IoT devices within a network (e.g., network 110), in some embodiments, in cooperation with IoT module 138 of Security service 140. Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

In various embodiments, IoT server 134 is configured to provide log or other data (e.g., collected from passively monitoring network 110) to IoT module 138 (e.g., via frontend 142). An example way of implementing IoT module 138 is using a microservices-based architecture. IoT module 138 can also be implemented using different programming languages, databases, hardware, and software environments, as applicable, and/or as services that are messaging enabled, bounded by contexts, autonomously developed, independently deployable, decentralized, and built and released with automated processes. One task performed by IoT module 138 is to identify IoT devices in the data provided by IoT server 134 (and provided by other embodiments of data appliances such as data appliances 136 and 148) and to provide additional contextual information about those devices (e.g., back to the respective data appliances).

Figure 2C:
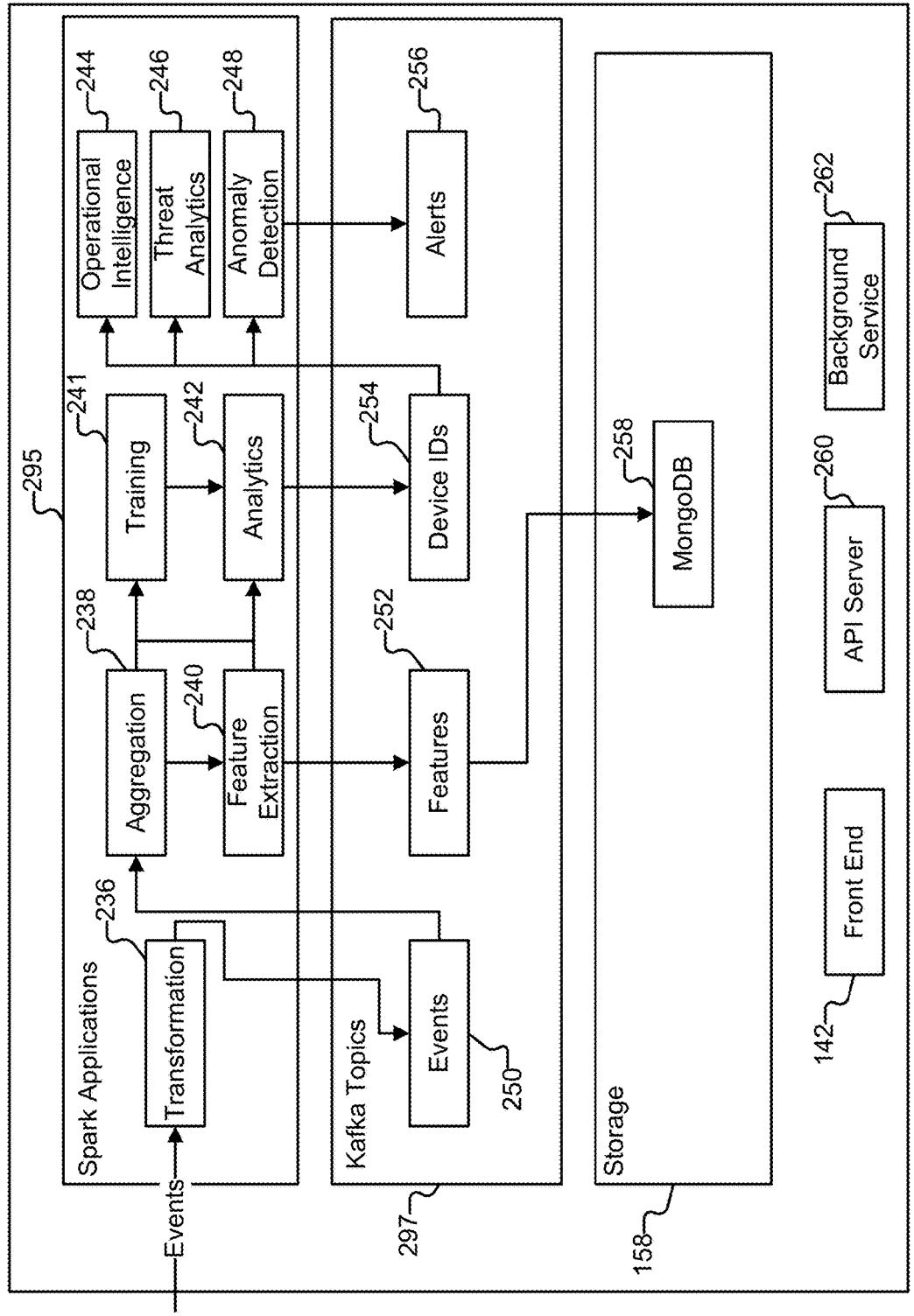
FIG. 2C illustrates an embodiment of an IoT module.

FIG. 2C illustrates an embodiment of an IoT module. Region 295 depicts a set of Spark Applications that run on intervals (e.g., every five minutes, every hour, and every day) across the data of all tenants. Region 297 depicts a Kafka message bus. Session event messages received by IoT module 138 (e.g., from IoT server 134) bundle together multiple events as observed at IoT server 134 (e.g., in order to conserve bandwidth). Transformation module 236 is configured to flatten the received session events into individual events and publish them at 250. The flattened events are aggregated by aggregation module 238 using a variety of different aggregation rules, which facilitates training of the model as shown at 241. An example rule is "for the time interval (e.g., 5 minutes), aggregate all event data for a specific device and each (APP-ID) application it used." Another example rule is "for the time interval (e.g., 1 hour), aggregate all event data for a particular device communicating with a particular destination IP address." For each rule, aggregation engine 238 tracks a list of attributes that need to be aggregated (e.g., a list of applications used by a device or a list of destination IP addresses). Feature extraction module 240 extracts features (252) from the attributes. Analytics module 242 uses the extracted features to perform device classification (e.g., using supervised and unsupervised learning), the results of which (254) are used to power other types of analytics (e.g., via operational intelligence module 244, threat analytics module 246, and anomaly detection module 248). Operational intelligence module 244 provides analytics related to the OT framework and operational or business intelligence (e.g., how a device is being used). Alerts (256) can be generated based on results of the analytics. In various embodiments, MongoDB 258 is used to store aggregated data and feature values. Background services 262 receive data aggregated by Spark applications and write data to MongoDB 258. API Server 260 pulls and merges data from MongoDB 258 to serve requests received from Front End 142.

Additional technical details for implementing IoT device identification by machine learning with time series behavioral and statistical features are disclosed in U.S. Patent Application Publication No. US-2023-0231860-A1, which is incorporated herein by reference in its entirety.

Overview of an IoT Policy Automated Recommendation Solution

Figure 3:
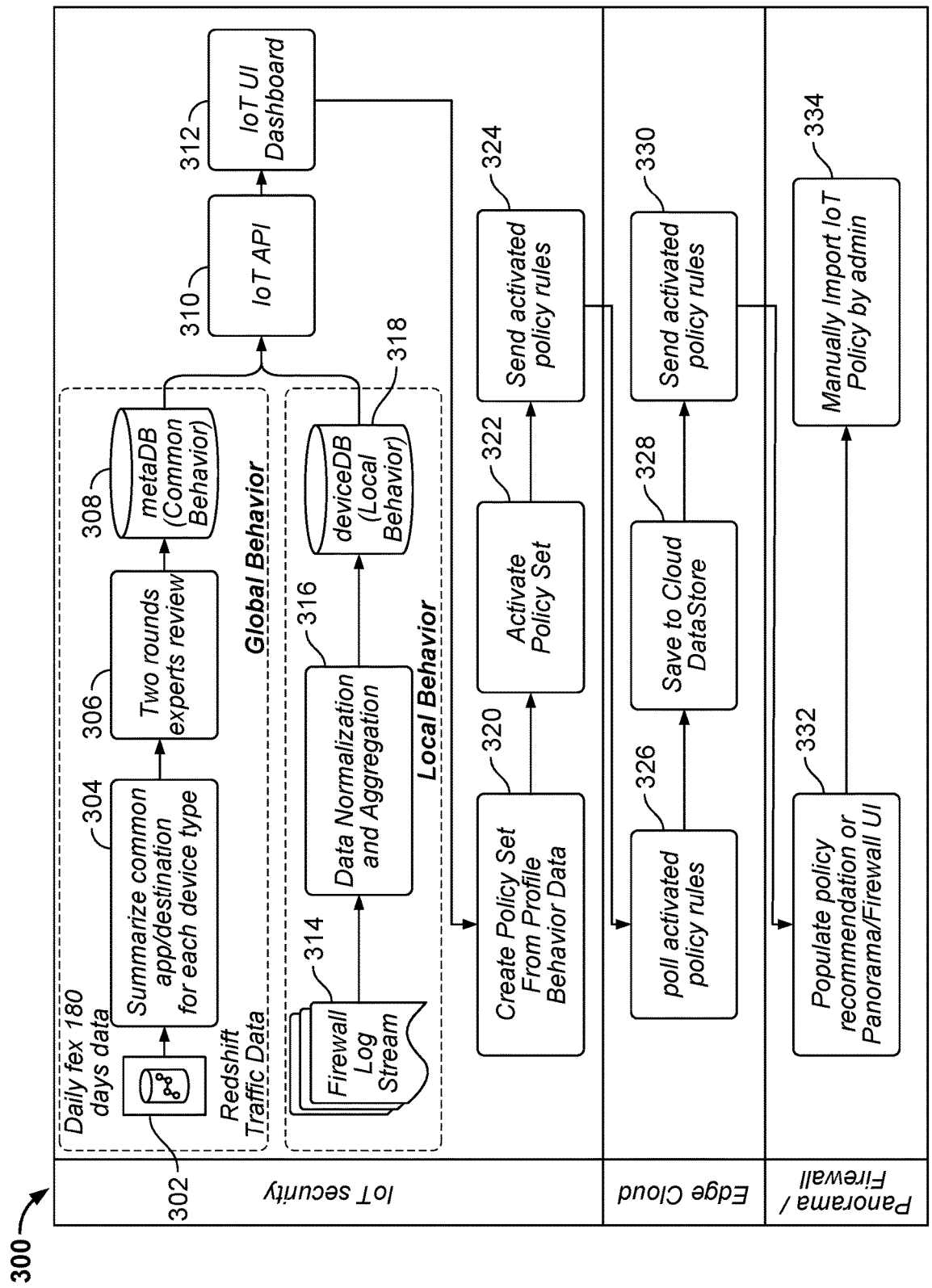
FIG. 3 illustrates an architecture of an IoT policy automated recommendation data flow in accordance with some embodiments.

FIG. 3 illustrates an architecture of an IoT policy automated recommendation data flow in accordance with some embodiments. Specifically, FIG. 3 illustrates a security policy automated recommendation data flow 300 that can be applied to provide security policy recommendations for configuring security platforms, such as firewall 102, for security enterprise network 110 that includes a plurality of IoT devices as similarly discussed above with respect to FIG. 1 (e.g., and such security policy recommendations that are based on the below described global behavior will also be applicable to other enterprise networks associated with other tenants/enterprise customers).

Referring to FIG. 3, security policy automated recommendation data flow 300 initiates an automated IoT device security solution that starts with a global behavior analysis for IoT devices in which the global behavior analysis is generating a global behavior analysis for common IoT device types across tenants (e.g., across distinct enterprise customers). Specifically, at 302, a data store (e.g., a cloud data store, such as the Amazon Redshift cloud data warehouse or another data store can similarly be used for storing such traffic data) stores a daily feed of 180 days of monitored network traffic data. At 304, common applications (apps) and destinations for each IoT device type are extracted from the network traffic data and summarized. At 306 (optionally), expert review (e.g., by security analysts) can be performed to verify the summarized common app/destination data for each of the IoT device types (e.g., to identify any anomalies, such as misidentified IoT device types, etc.). At 308, the global common behavior analysis results are stored in a meta data store (e.g., a database, such as an SQL or other database). The disclosed techniques for IoT policy recommendation Large Language Model (LLM) embeddings based on global behavior learning will be further described below with respect to various embodiments.

The security policy automated recommendation data flow 300 also performs a local behavior analysis for IoT devices in which the local behavior analysis is generating a local behavior analysis for common IoT device types for each given tenant (e.g., each enterprise customer). Specifically, at 314, a firewall log stream (e.g., such as a log stream from firewall 102 as shown in FIG. 1) is received. At 316, data normalization and aggregation is performed to facilitate an automated generation of local common behavior analysis results that are stored at 318 in a device data store (e.g., a database, such as an SQL or other database).

As shown at 310, the global common behavior analysis results and local common behavior analysis results are accessible via an IoT application programming interface (API) that can be used by a user interface for IoT security services, as shown at IoT UI dashboard 312 (e.g., a graphical user interface (GUI) or another interface that can provide a dashboard that allows Information Technology (IT)/network/security administrators (admins) to utilize the results to access such global and common behavior analysis results). For example, the IoT UI dashboard can be used for automatically generating a policy, such as a security policy for IoT devices as will now be further described below.

Specifically, as shown at 320, a policy (e.g., an IoT device security policy) is automatically generated from the profile behavior data based on the global and common behavior analysis results. At 322, the policy set of rules can be automatically activated. At 324, the activated policy rules can be sent/deployed to one or more security platforms (e.g., NGFWs/firewalls) using the Edge Cloud as will be further described below.

As shown at the Edge Cloud, polling of activated IoT security policy rules is performed at 326 and saved to a cloud data store at 328. The activated IoT security policy rules are sent/deployed at 330 to the security platforms using a security platform configuration solution (e.g., Panorama, which is a security platform/firewall configuration solution that is commercially available from Palo Alto Networks, Inc., headquartered in Santa Clara, CA, or another a security platform/firewall configuration solution can similarly be used).

At 332, the IoT device security policy recommendations are populated in the Panorama/firewall UI. At 334, the admin (e.g., IT/network/security admin) can manually import (e.g., or in some implementations, such can be configurable as an automated importation) the IoT device security policy recommendations. As such, the security platforms/firewalls for the enterprise network can thereby automatically be configured using the IoT device security policy recommendations.

Removing Noisy Samples for a Global Behavior Analysis for Automatically Generating IoT Device Security Policy Recommendations The disclosed techniques for IoT policy recommendation Large Language Model (LLM) embeddings based on global behavior learning will now be further described below with respect to various embodiments. For example, as discussed above, noisy data is a technical challenge for performing the disclosed techniques for a global behavior analysis for automatically generating IoT device security policy recommendations, which will be further discussed below with respect to FIG. 4.

An example source of noisy samples in enterprise networks is mixed traffic devices. IoT devices that tend to access applications that are not designed or applicable to their profile are labeled as mixed traffic devices. The applications used by mixed traffic devices tend to be incorrect for that device type. The incorrect application behavior emanates from the incorrectly identified device. This results in providing incorrect behavior for the profile.

As such, this example of mixed traffic devices is removed in some embodiments. In an example implementation, mixed traffic devices can be removed as will now be described. Device identification history is checked; if a device has been identified with more than two different profile IDs, then it is removed. The profile IDs can be provided from both an ML model and rule-based model.

Another source of noisy samples in enterprise networks is mismatch devices. Examples of such mismatch devices include devices in which their associated profile ID, vendor, model, operating system (OS) group, and/or OS version does not align with each other (e.g., a PC Windows device with an Apple Vendor and iPad model). Such mismatch devices are preferably removed as a source of noisy sample data as such device attribute mismatches are typically caused by insufficient data, limitations from third party integration, and/or the device is a dynamic IP endpoint (e.g., a dynamically assigned IP address, such as using the Dynamic Host Control Protocol (DHCOP)). As a result, the device identity for such mismatch devices is generally not reliable.

As such, this example of mixed traffic devices is also removed in some embodiments. In an example implementation, mixed traffic devices can be removed as will now be described. A daily common attribute learning job can be performed, which collects identity attribute data from all the active devices and learns the common attribute pattern associated with each device type (profile). A mismatch detection job is then performed that marks the device as a mismatch if its attribute pattern does not match the common behavior.

Further, the usage of Network Address Translation (NAT) devices is common in enterprise networks. For example, NAT allows users to replace their internal IP addresses with a single external wide area network address. However, the use of NAT can also generate noisy samples for a global behavior analysis for automatically generating IoT device security policy recommendations, which will be further discussed below with respect to FIG. 4. Specifically, NAT allows users to connect to the Internet anonymously. The traffic from a NAT device is usually a mix of traffic from multiple devices (e.g., multiple distinct IoT devices) behind such NAT devices (e.g., a NAT device, such as network equipment for an enterprise network, will typically show app usage of different profiles as such NAT devices can have different types of devices including IoT devices that are behind the NAT devices, such as an IP phone, a personal computer, a printer, a projector, a facsimile, a scanner, a medical device, etc., which will typically be associated with different apps and network related behaviors including protocols, etc.). As such, NAT is removed as part of the disclosed global behavior analysis for automatically generating IoT device security policy recommendations as will now be described below with respect to FIG. 4.

Figure 4:
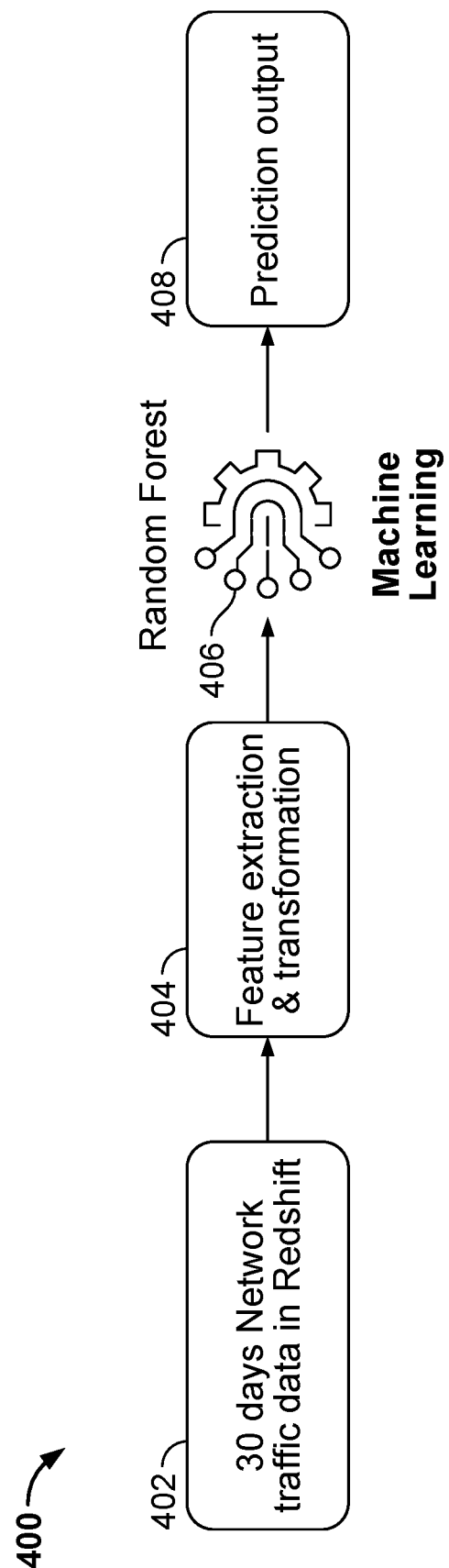
FIG. 4 is an architecture for removal of noisy data for an IoT policy automated recommendation data flow in accordance with some embodiments.

FIG. 4 is an architecture 400 for removal of noisy data for a security policy automated recommendation data flow in accordance with some embodiments. In this example implementation of removal of noisy samples associated with NAT devices, a Random Forest machine learning (ML) model (e.g., or another ML technique/algorithm can similarly be generated/trained) is generated/trained to automatically detect NAT devices based on static and dynamic features extracted from the monitored network traffic data. Specifically, the Random Forest ML model for automated NAT device detection based on network traffic processing can be deployed as a component/module as part of an IoT ML device identification job performed periodically (e.g., daily), such as similarly described above with respect to FIG. 1.

Referring to FIG. 4, at 402, 30 days of network traffic data is received at the cloud data store (e.g., a cloud data store, such as the Amazon Redshift cloud data warehouse or another data store can similarly be used for storing such traffic data). At 404, feature extraction and transformation of the extracted features are provided as input to the previously generated and trained Random Forest ML model 406 (e.g., or another ML model can similarly be used, such as using a deep neural network (DNN), etc.). In this example implementation, a periodic job (e.g., daily job) is executed as a submodule under the IoT ML device identification job (e.g., as similarly described above with respect to FIG. 1) that removes NAT devices. Specifically, the periodic job executes the Random Forest ML model 406 that detects NAT devices based on static and dynamic features extracted from network traffic data. The Random Forest ML model 406 then generates an output of a prediction of samples that are associated with NAT devices (e.g., which can be removed from the data used for generating global common behavior analysis of IoT devices for security policy recommendations as similarly discussed above) as shown at 408.

In this example implementation, static features include IP-based features extracted from the network traffic (e.g., additional static features can include Organizational Unique Identifier (OUI), OUI Manufacturer, OS group history, model history, vendor history, etc.). The dynamic features can include volume associated features (e.g., total bytes, total packets, number of connections, etc.). The dynamic features can also include application (app) related features (e.g., app usage, user agent history, hostname history, etc.).

LLM Embeddings and Clustering for Providing IoT Policy Recommendations Based on Global Behavior Learning As described herein, global behavior learning for IoT device behavior is performed to facilitate automatically generating security policy rule recommendations. In an example implementation, global behavior learning for IoT device behavior is performed based on acceptable network behaviors for IoT devices across multiple tenants (e.g., a plurality of distinct enterprise customers of the IoT security service) for the same device profile. As will be described below with respect to FIG. 5A, an architecture for providing global behavior learning for IoT device behavior to facilitate automatically generating security policy rule recommendations can include the following stages of process: (1) feature generation, (2) noisy sample removal, and (3) infrequent behavior removal.

Figure 5A:
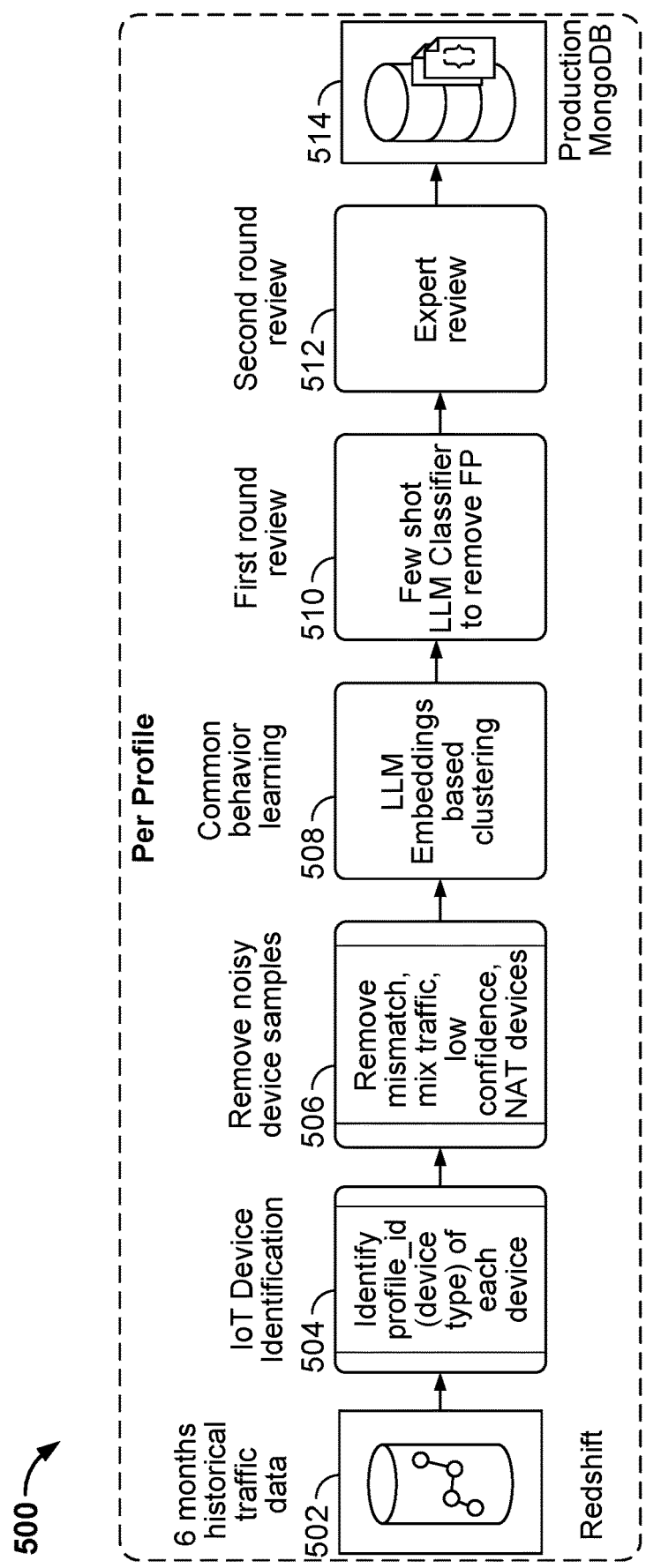
FIG. 5A is an overview of an architecture for performing LLM embeddings and clustering for providing IoT policy recommendations based on global behavior learning in accordance with some embodiments.

FIG. 5A is an overview of an architecture for performing LLM embeddings and clustering for providing IoT policy recommendations based on global behavior learning in accordance with some embodiments. Specifically, FIG. 5A illustrates an architecture 500 for performing LLM embeddings and clustering for providing IoT policy recommendation LLM embeddings based on global behavior learning, such as more generally described above with respect to stages 302 thru 308 as shown in FIG. 3.

Feature Generation

Referring to FIG. 5A, at 502, raw data of applications used by each IoT device in the last 6 months (e.g., in the last 180 days) is stored in a data store (e.g., a cloud data store, such as the Amazon Redshift cloud data warehouse or another data store can similarly be used for storing such traffic data). In an example implementation, application descriptions are provided in order for the LLM model (e.g., LLM classifier) to understand the context. In this example implementation, the device application and destination information is used as features and the Amazon Redshift cloud data warehouse is used for data aggregation for each profile type (e.g., and can be deployed using Amazon's Elastic Kubernetes Service (EKS) or another commercially available cloud computing platform can similarly be used).

IoT Device Identification

At 504, IoT device identification is performed. For example, a profile identification (ID) (e.g., device type) of each IoT device is determined. In this example implementation, this information is then to be converted into embeddings that hold the description information (e.g., using sentence-transformer embeddings). Example embeddings will be further described below with respect to FIGS. 5B-D.

Removal of Noisy Device Samples

At 506, noisy IoT device samples are removed. In this example implementation, removal of noisy IoT device samples includes removing mismatch, mixed traffic, low confidence, NAT devices, such as similarly described above with respect to FIG. 4.

Common Behavior Learning

At 508, to determine common global behavior across these IoT devices, the app usage is analyzed for each IoT device of a profile type. Then for each IoT device, a single embedding is generated by averaging the embeddings for each app used by that IoT device. In addition, LLM embeddings-based clustering is performed at this stage for performing common global behavior learning. In this example implementation, once each IoT device has its average embedding, the IoT devices are clustered using the embeddings. From the resulting clusters, we select clusters larger than a predetermined threshold (e.g., given that unusual behavior typically occurs due to a relatively few number of IoT devices, in an example implementation, a threshold can be set to be 10 devices (which can change based on empirical data, and such threshold value can be reconfigured accordingly); and based on the configured threshold value, IoT devices that are included in clusters whose size is below the threshold value can be removed) to remove the clusters with few unusual behavior IoT devices.

Specifically, in this example implementation, the aggregated network traffic data is converted into text features (e.g., application name, application description, application category, application subcategory, and/or profile name). The text features are then converted into embeddings using the LLMs. These embeddings hold the information related to profile type and the app usage. Based on these embeddings, a similarity search is performed that clusters similar profile types and app usage behaviors together. Based on these clusters, the behavior of the profile types can be identified and, as a result, global common behavior is generated. More specifically, the clusters facilitate separation of unwanted behaviors thereby removing noisy device samples for a given profile type.

In some cases, a blocklist-based approach is also applied to remove certain app sub-categories for profile categories that should not be associated with such behaviors. For example, Radiography System profiles can blocklist social-networking and photo-video apps. Also, a golden devices dataset can be used, which includes devices with a high confidence profile ID prediction, to generate common apps for profiles that appear in the golden devices dataset. Also, low confidence devices can also be automatically removed in order to generate accurate behavior. In addition, a behavior that shows up in less than a predetermined threshold percentage of IoT devices (e.g., 10% of IoT devices) can be deemed as infrequent and, as a result, can be automatically excluded for global common behavior results.

Verification of Results

At 510, the generated and trained LLM classifier is applied to automatically remove unusual apps from the selected cluster. As such, the LLM classifier effectively and efficiently provides a first round of review to remove False Positives (FPs). For example, the LLM classifier uses few shot examples of application name, application descriptions, and profiles to generate a verdict of yes, no, or unclear. Based on the given information and the LLM classifier's capability and knowledge, decision as to whether the application will be used by the profile or not is automatically generated.

At 512, a second round review is performed by experts to verify the app usage (e.g., IoT device experts can perform a second level review of the results prior to publication performed at stage 514), such as similarly described above with respect to stage 306 as shown in FIG. 3.

Automated Generation of IoT Device Policy Rules

At 514, after the above-described second round review, the apps are published to a data store for each profile (e.g., a production database, such as a MongoDB or another commercially available database can similarly be used). In this example implementation, after the review/verification processing is complete, a review JSON file is used to update a table (e.g., a Profile Personality table) in a data store (e.g., a meta database). A daily job updates the common apps, profile, and URL for the profile IDs included in the JSON file. The apps from the updated table are then accessible to customers of the security service through the dashboard, such as similarly described above with respect to FIG. 3.

Figure 5B:
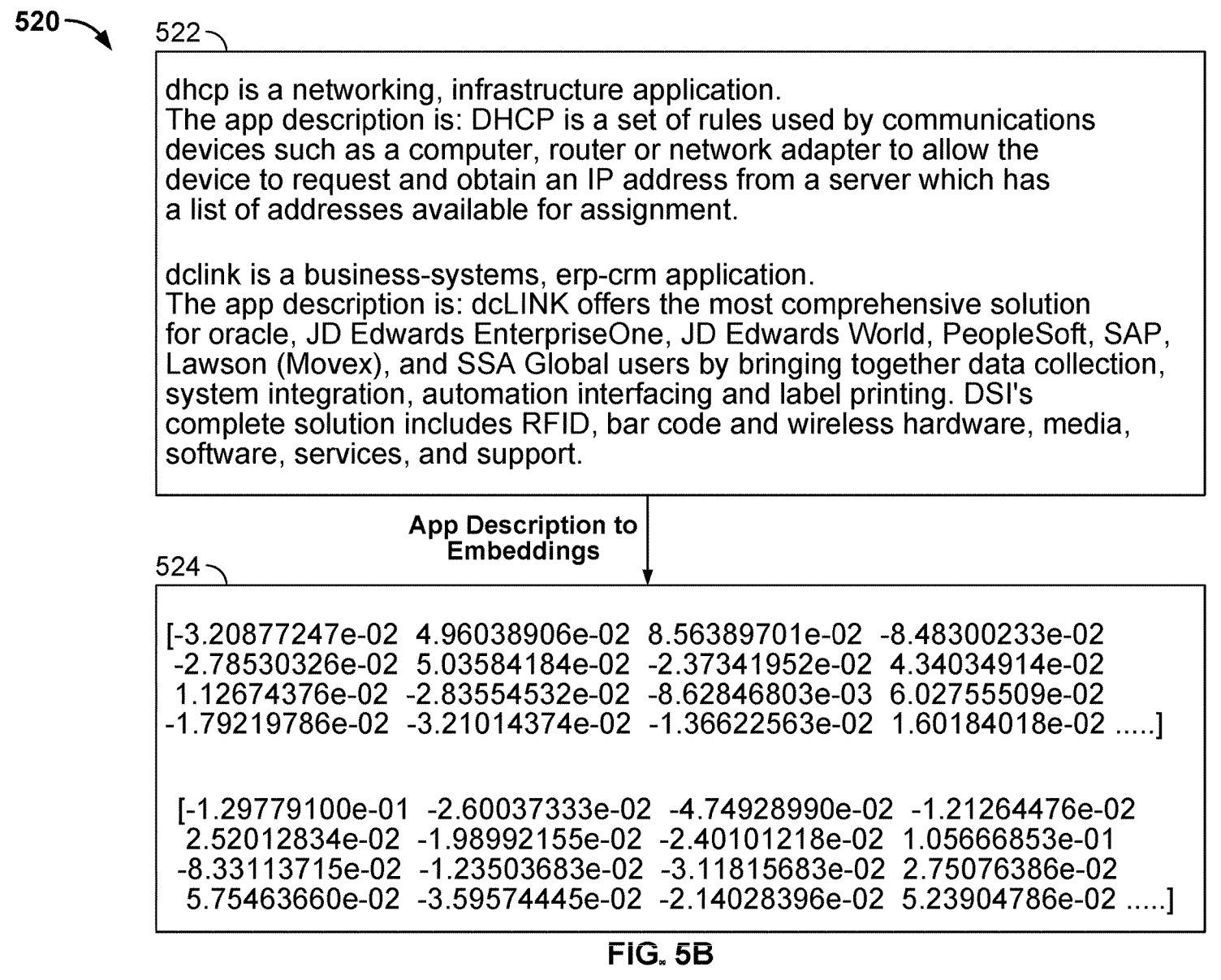

FIG. 5B is an example of an embedding in accordance with some embodiments. As shown at 520, an app description 522 is converted to embeddings as shown at 524. In this example implementation, the text embeddings are implemented using a commercially available Vertex AI text-embeddings API that facilitates generating text embeddings with generative AI, which is commercially y available at https://cloud.google.com/vertex-ai/docs/generative-ai/embeddings/get-text-embeddings from Google Cloud services (e.g., or another commercially available text embeddings platform can similarly be used).

FIGS. 5C-1 and 5C-2 illustrates an identification of common behavior using embedding and clustering in accordance with some embodiments. As shown at 530 in FIG. 5C-1, a cluster 1 includes 50 IoT devices associated with the listed applications. As shown at 535 in FIG. 5C-2, a cluster 5 includes five IoT devices associated with a longer list of applications. Specifically, these two clusters were generated based on an experiment applying the above described LLM embeddings and clustering techniques for global common behavior for an X-Ray machine profile. Cluster 1 as shown at 530 in FIG. 5C-1 includes applications, such as Dicom, which are of a typical/expected behavior with such a profile. In contrast, cluster 5 shown at 535 in FIG. 5C-2 includes many more applications, including many social media apps, which are atypical/not expected for an X-Ray machine profile.

FIG. 5D illustrates an identification of common behavior using an LLM classifier in accordance with some embodiments. As similarly described above with respect to FIG. 5A, the disclosed LLM classifier is applied to filter atypical/not expected apps from the selected cluster as our first round review. Referring to FIG. 5D, an example of how LLM classifies the apps and filters atypical/not expected apps is shown at 540. In this example implementation, the LLM classifier/model is provided with app descriptions as similarly described above in FIG. 5A in order for it to understand the context/usage to facilitate effective application of LLM modeling techniques to facilitate the application for an identification of common behavior using the LLM classifier as described herein.

Additional process embodiments for IoT policy recommendation LLM embeddings based on global behavior learning will now be further described below with respect to various embodiments.

Figure 6:
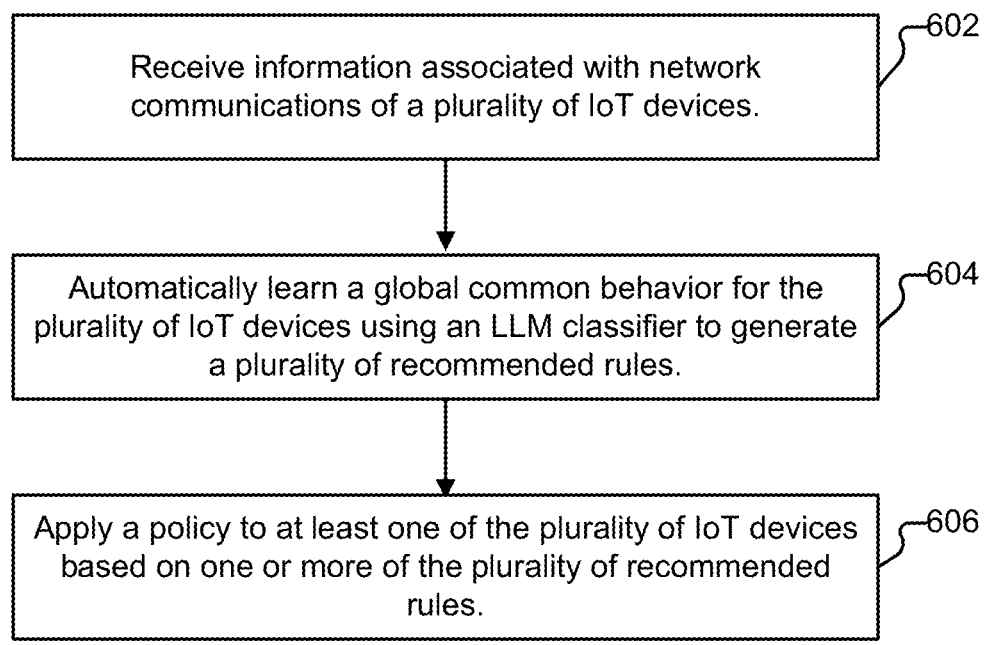
FIG. 6 is a flow diagram for IoT policy recommendation LLM embeddings based on global behavior learning in accordance with some embodiments.

Example Process Embodiments for IoT Policy Recommendation LLM Embeddings Based on Global Behavior Learning FIG. 6 is a flow diagram for IoT policy recommendation LLM embeddings based on global behavior learning in accordance with some embodiments. In some embodiments, process 600 is implemented at least in part by security service 140 of FIG. 1 and/or data appliance 102 of FIGS. 2A and 2B.

At 602, information associated with network communications of a plurality of Internet of Things (IoT) devices is received. For example, a security service can collect the information associated with the network communications of the plurality of IoT devices, such as similarly described above with respect to FIGS. 3 and 5A.

At 604, automatically learning a global common behavior for the plurality of IoT devices using a Large Language Model (LLM) classifier to generate a plurality of recommended rules is performed. For example, the LLM classifier can be trained and applied to identify common behavior patterns of IoT devices from the information associated with network communications of the plurality of IoT devices for generating the plurality of recommended rules, such as similarly described above with respect to FIG. 5A.

At 606, applying a policy to at least one of the plurality of IoT devices based on one or more of the plurality of recommended rules is performed. For example, a security policy can be deployed to security platforms of each tenant, such as similarly described above with respect to FIG. 3.

Figure 7:
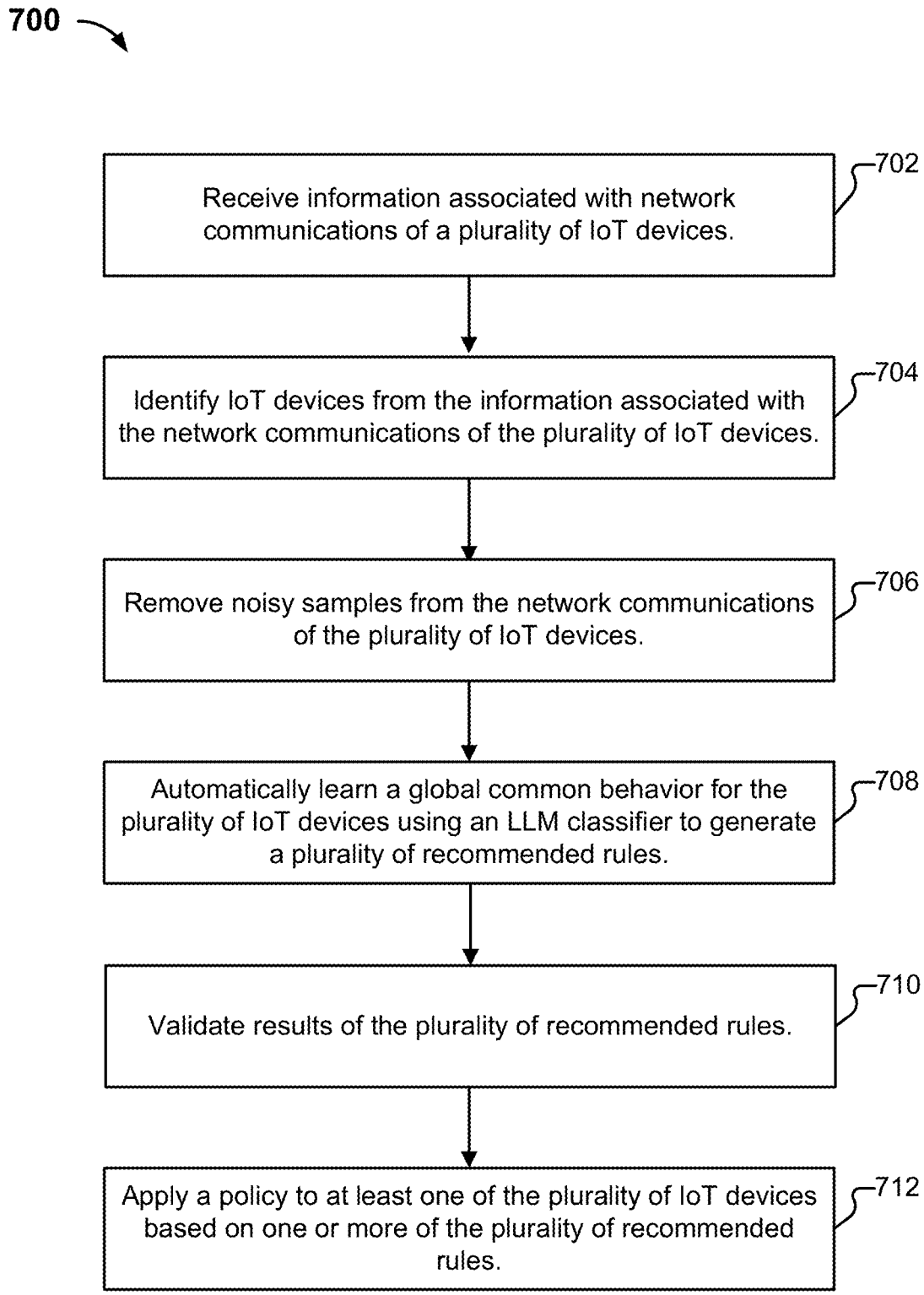
FIG. 7 is another flow diagram for IoT policy recommendation LLM embeddings based on global behavior learning in accordance with some embodiments.

FIG. 7 is another flow diagram for IoT policy recommendation LLM embeddings based on global behavior learning in accordance with some embodiments. In some embodiments, process 700 is implemented at least in part by security service 140 of FIG. 1 and/or data appliance 102 of FIGS. 2A and 2B.

At 702, information associated with network communications of a plurality of Internet of Things (IoT) devices is received. For example, a security service can collect the information associated with the network communications of the plurality of IoT devices, such as similarly described above with respect to FIGS. 3 and 5A.

At 704, identifying IoT devices from the information associated with the network communications of the plurality of IoT devices is performed. For example, the IoT devices can be identified from the information associated with the network communications of the plurality of IoT devices, such as similarly described above with respect to FIGS. 3 and 5A.

At 706, removing noisy samples from the network communications of the plurality of IoT devices is performed. For example, the noisy samples can be removed from the network communications of the plurality of IoT devices, such as similarly described above with respect to FIGS. 4 and 5A.

At 708, automatically learning a global common behavior for the plurality of IoT devices using a Large Language Model (LLM) classifier to generate a plurality of recommended rules is performed. For example, the LLM classifier can be trained and applied to identify common behavior patterns of IoT devices from the information associated with network communications of the plurality of IoT devices for generating the plurality of recommended rules, such as similarly described above with respect to FIG. 5A.

At 710, results of the plurality of recommended rules are validated. For example, the results of the plurality of recommended rules can be validated as similarly described above with respect to FIGS. 3 and 5A.

At 712, applying a policy to at least one of the plurality of IoT devices based on one or more of the plurality of recommended rules is performed. For example, a security policy can be deployed to security platforms of each tenant, such as similarly described above with respect to FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled to the processor and configured to store instructions which when executed by the processor perform the following:
     receive information associated with network communications of a plurality of Internet of Things (IoT) devices;
     extract features from the received information;
     remove noisy IoT devices from the plurality of IoT devices to obtain a remaining plurality of IoT devices, comprising to:
       detect, using a model, network address translation (NAT) devices based on the extracted features, wherein the model is trained using a machine learning technique; and
       remove the NAT devices from the plurality of IoT devices to obtain the remaining plurality of IoT devices;
     automatically determine a global common behavior for the plurality of IoT devices using a Large Language Model (LLM) classifier to generate a plurality of recommended rules, comprising to:
       automatically determine the global common behavior for the plurality of IoT devices using data associated with network communications of the remaining plurality of IoT devices; and
     apply a policy to at least one of the plurality of IoT devices based on one or more of the plurality of recommended rules.

2. The system of claim 1, wherein the plurality of IoT devices is associated with a plurality of tenants of a security service.

3. The system of claim 1, wherein the plurality of recommended rules includes a security policy rule.

4. The system of claim 1, wherein the plurality of recommended rules includes a security policy rule that is based on applications (apps) and/or destinations learned from the global common behavior for the plurality of IoT devices.

5. The system of claim 1, wherein the LLM classifier is applied to identify common behavior patterns of IoT devices from the information associated with the network communications of the plurality of IoT devices for generating the plurality of recommended rules.

6. The system of claim 1, wherein the processor is further configured to perform device identification based on the information associated with the network communications of the plurality of IoT devices.

7. The system of claim 1, wherein the processor is further configured to perform text embeddings based on a plurality of features extracted from the information associated with the network communications of the plurality of IoT devices.

8. The system of claim 1, wherein the processor is further configured to:
   perform text embeddings based on a plurality of features extracted from the information associated with the network communications of the plurality of IoT devices; and
   perform clustering based on the text embeddings.

9. The system of claim 1, wherein the processor is further configured to train the LLM classifier.

10. The system of claim 1, wherein the processor is further configured to train the LLM classifier using unsupervised machine learning (ML) training without any labels.

11. The system of claim 1, wherein the processor is further configured to periodically update a training of the LLM classifier.

12. The system of claim 1, wherein the processor is further configured to publish the plurality of recommended rules.

13. The system of claim 1, wherein the processor is further configured to publish the plurality of recommended rules to a dashboard, wherein the dashboard is accessible to a plurality of tenants of a security service.

14. A method comprising:
   receiving information associated with network communications of a plurality of Internet of Things (IoT) devices;
   extracting features from the received information;
   removing noisy IoT devices from the plurality of IoT devices to obtain a remaining plurality of IoT devices, comprising:
     detecting, using a model, network address translation (NAT) devices based on the extracted features, wherein the model is trained using a machine learning technique; and
     removing the NAT devices from the plurality of IoT devices to obtain the remaining plurality of IoT devices;
   automatically determining a global common behavior for the plurality of IoT devices using a Large Language Model (LLM) classifier to generate a plurality of recommended rules, comprising:
     automatically determining the global common behavior for the plurality of IoT devices using data associated with network communications of the remaining plurality of IoT devices; and
   applying a policy to at least one of the plurality of IoT devices based on one or more of the plurality of recommended rules.

15. The method of claim 14, wherein the plurality of IoT devices is associated with a plurality of tenants of a security service.

16. The method of claim 14, wherein the plurality of recommended rules includes a security policy rule.

17. The method of claim 14, wherein the plurality of recommended rules includes a security policy rule that is based on applications (apps) and/or destinations learned from the global common behavior for the plurality of IoT devices.

18. A computer program product embodied in a non-transitory computer readable medium and comprising computer instructions for:
- receiving information associated with network communications of a plurality of Internet of Things (IoT) devices;
- extracting features from the received information;
- removing noisy IoT devices from the plurality of IoT devices to obtain a remaining plurality of IoT devices, comprising:
  - detecting, using a model, network address translation (NAT) devices based on the extracted features, wherein the model is trained using a machine learning technique; and
  - removing the NAT devices from the plurality of IoT devices to obtain the remaining plurality of IoT devices;
- automatically determining a global common behavior for the plurality of IoT devices using a Large Language Model (LLM) classifier to generate a plurality of recommended rules, comprising:
  - automatically determining the global common behavior for the plurality of IoT devices using data associated with network communications of the remaining plurality of IoT devices; and
- applying a policy to at least one of the plurality of IoT devices based on one or more of the plurality of recommended rules.

19. The computer program product of claim 18, wherein the plurality of IoT devices is associated with a plurality of tenants of a security service.

20. The system of claim 1, wherein the machine learning technique includes a random forest machine learning technique.

* * * * *